(12) United States Patent
Jones et al.

(10) Patent No.: US 12,036,908 B2
(45) Date of Patent: Jul. 16, 2024

(54) SOD SCRAP COLLECTION APPARATUS AND METHOD

(71) Applicant: First Products, Inc., Tifton, GA (US)

(72) Inventors: Donald C. Jones, Tifton, GA (US); Alan L. McLeod, Sycamore, GA (US)

(73) Assignee: FIRST PRODUCTS, INC., Tifton, GA (US)

( * ) Notice: Subject to any disclaimer, the term of this patent is extended or adjusted under 35 U.S.C. 154(b) by 346 days.

(21) Appl. No.: 17/673,327

(22) Filed: Feb. 16, 2022

(65) Prior Publication Data

US 2023/0256883 A1    Aug. 17, 2023

(51) Int. Cl.
   *B60P 1/38* (2006.01)
   *B60P 1/30* (2006.01)

(52) U.S. Cl.
   CPC .. *B60P 1/38* (2013.01); *B60P 1/30* (2013.01)

(58) Field of Classification Search
   CPC ................ B60P 1/38; B60P 1/36; B60P 1/365
   USPC ........................................................ 414/338
   See application file for complete search history.

(56) References Cited

U.S. PATENT DOCUMENTS

| | | | | |
|---|---|---|---|---|
| 2,539,939 A * | 1/1951 | Willard | .................. | B65G 65/06 414/21 |
| 2,615,586 A * | 10/1952 | Miller | ....................... | B60P 1/36 198/511 |
| 2,653,721 A * | 9/1953 | Cantrell | ............... | A01D 87/122 414/523 |
| 3,053,372 A * | 9/1962 | Gallagher | ............ | A01D 87/122 198/310 |
| 3,802,022 A * | 4/1974 | Fleming | .................. | E01H 1/042 56/12.9 |
| 3,927,780 A * | 12/1975 | Dearlove | .................. | B65F 3/18 198/308.1 |
| 4,051,961 A * | 10/1977 | Williams | .................. | B60P 1/36 198/301 |
| 4,185,731 A * | 1/1980 | Van Drie | .................. | B65F 3/00 414/334 |

* cited by examiner

*Primary Examiner* — Jonathan Snelting
(74) *Attorney, Agent, or Firm* — Thomas | Horstemeyer, LLP

(57) ABSTRACT

A sod scrap collection apparatus is disclosed that enables pickup and collection of scraps of sod that have been discarded on the ground. The apparatus is pulled by a tractor and includes a pickup head followed by a dump bed. A pickup head conveyor moves pickup teeth along and over the ground at a particular distance in order to scrape up sod scraps and discard them into the dump bed where they are collected. A dump bed conveyor of the dump bed, which runs in the opposite direction as the pickup head conveyor, moves parallel spaced sweeping bars along a top of the sod scraps residing in the dump bed at an upward angle from front to back, so that the dump bed fills with the sod scraps efficiently from front to back.

28 Claims, 5 Drawing Sheets

FIG. 5
VIEW A-A
END VIEW OF PICK UP HEAD

SOD SCRAP COLLECTION APPARATUS AND METHOD

FIELD OF THE INVENTION

The present disclosure generally relates to mechanized farming equipment, and more particularly, to sod farm machinery that can be used to remove scraps of sod, or grass, that have been discarded on the ground.

BACKGROUND OF THE INVENTION

Scraps of sod, or grass, are a problem on sod farms across the country. When harvesting the sod, there are pieces that are not suitable for use and sale, and the sod harvester discards them on the ground in the sod field. Usually, the picking up and removal of scraps is a tedious manual job, and labor has become harder to find in recent years.

SUMMARY OF THE INVENTION

The present disclosure provides various embodiments of a sod scrap collection apparatus and method that enable pickup and collection of scraps of sod that have been discarded on the ground.

One embodiment, among others, can be generally summarized as a sod scrap collection apparatus that is pulled by a tractor and includes a pickup head followed by a dump bed. A pickup head conveyor (chain or belt) moves pickup teeth along and over the ground at a particular distance in order to scrape up sod scraps and discard them into the dump bed where the sod scraps are collected. A dump bed conveyor (chain or belt) of the dump bed, which runs in the opposite direction as the pickup head conveyor, moves parallel spaced sweeping bars along a top of the sod scraps residing in the dump bed at an upward angle from front to back, so that the dump bed fills with the sod scraps efficiently from front to back.

Another embodiment, among others, is a method for picking up and collecting scraps of sod from the ground. This embodiment can be broadly summarized by the following steps: pulling a pickup head with a tractor along the ground, the pickup head having a top and a bottom, the conveyor having outwardly extending pickup teeth; grasping the sod scraps with the pickup teeth at the bottom as the pickup head is pulled along the ground; moving the sod scraps upwardly to the top; and discarding the sod scraps at or substantially near the top.

Another embodiment, among others, is another method that comprises the steps of: pulling a dump bed with the pickup head as defined in the previous paragraph; and discarding the sod scraps into the dump bed.

Other embodiments of methods, apparatus, systems, methods, features, and advantages of the present disclosure will be or become apparent to one with skill in the art upon examination of the following drawings and detailed description. It is intended that all such additional embodiments of methods, apparatus, systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF EMBODIMENTS

Figure 3:
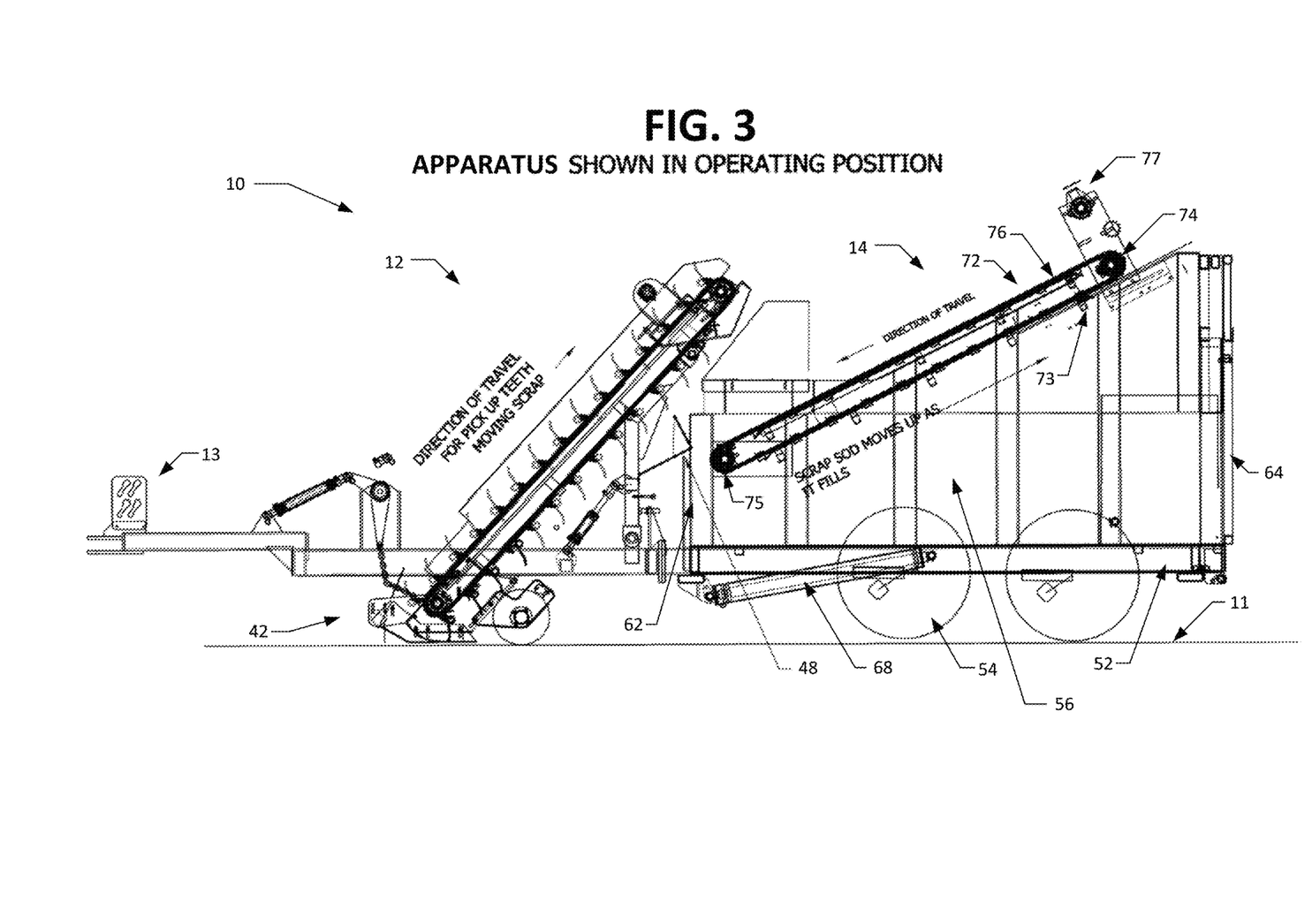
FIG. 3 is a side view of the sod scrap collection apparatus according to the present disclosure, which has the pickup head of FIG. 1 in combination with a dump bed for collecting and storing the sod scraps that are picked up from the ground.
Figure 4:
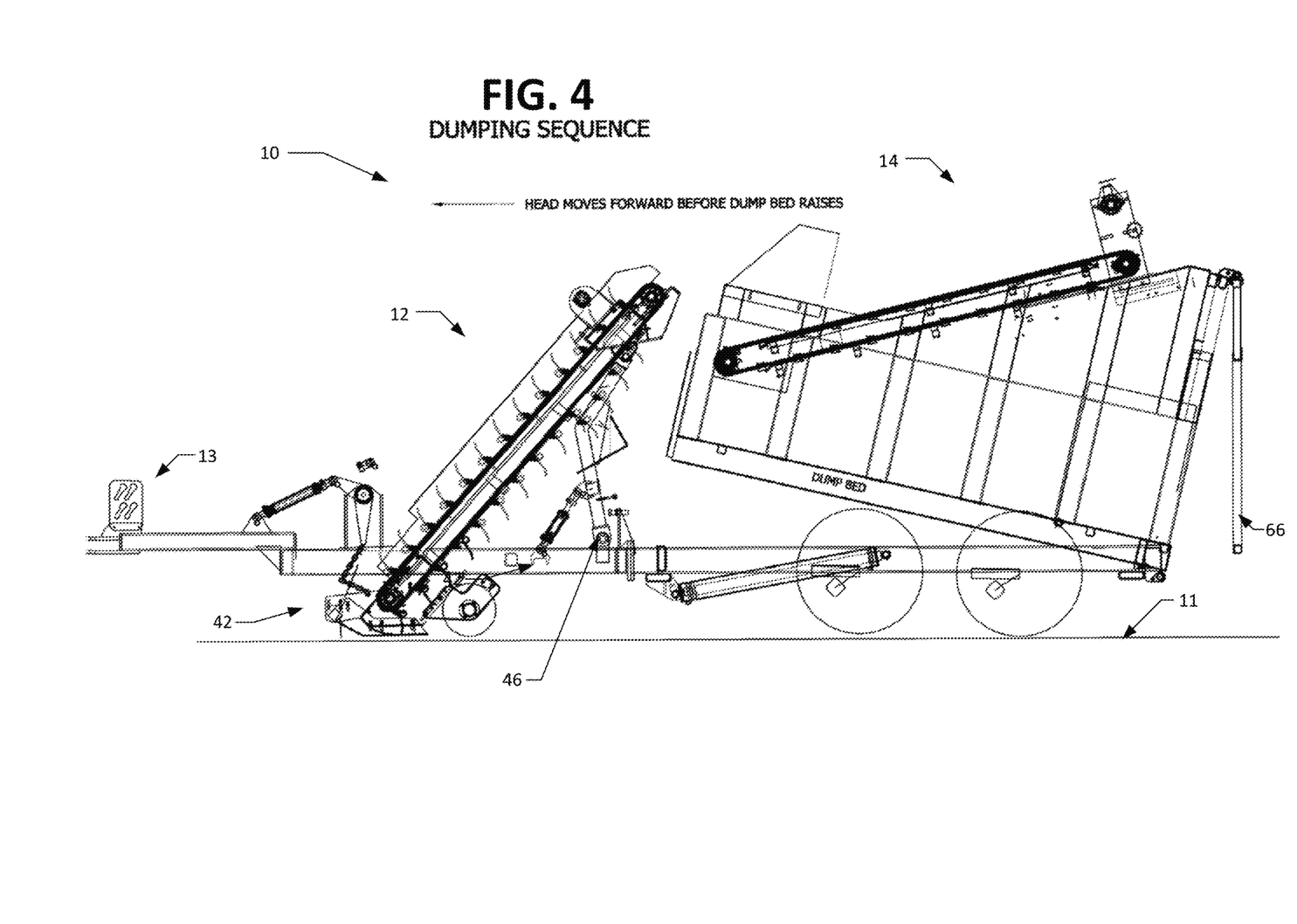
FIG. 4 is a side view of the sod scrap collection apparatus of FIG. 3, which shows a dumping procedure where the pickup head is pivoted forward while the dump bed is pivoted backward in order to dump sod scraps from the dump bed.

The present disclosure provides various embodiments of a sod scrap collection apparatus 10, the fully assembled version of which is shown in FIGS. 3 and 4. The sod scrap collection apparatus 10 enables pickup and collection of scraps of sod from the ground 11. The sod scrap collection apparatus 10 is detachably connectable to and can be pulled by a tractor (not shown) via a suitable hitch or other attachment mechanism 13. The sod scrap collection apparatus 10 generally includes a pickup head 12 and a dump bed 14. In some embodiments, the dump bed 14 is detachably connected to the pickup head 12. In other embodiments, they are permanently connected together. In yet other embodiments, the pickup head 12, the bump bed 14, and the tractor can be configured as a single farming machine.

Figure 1:
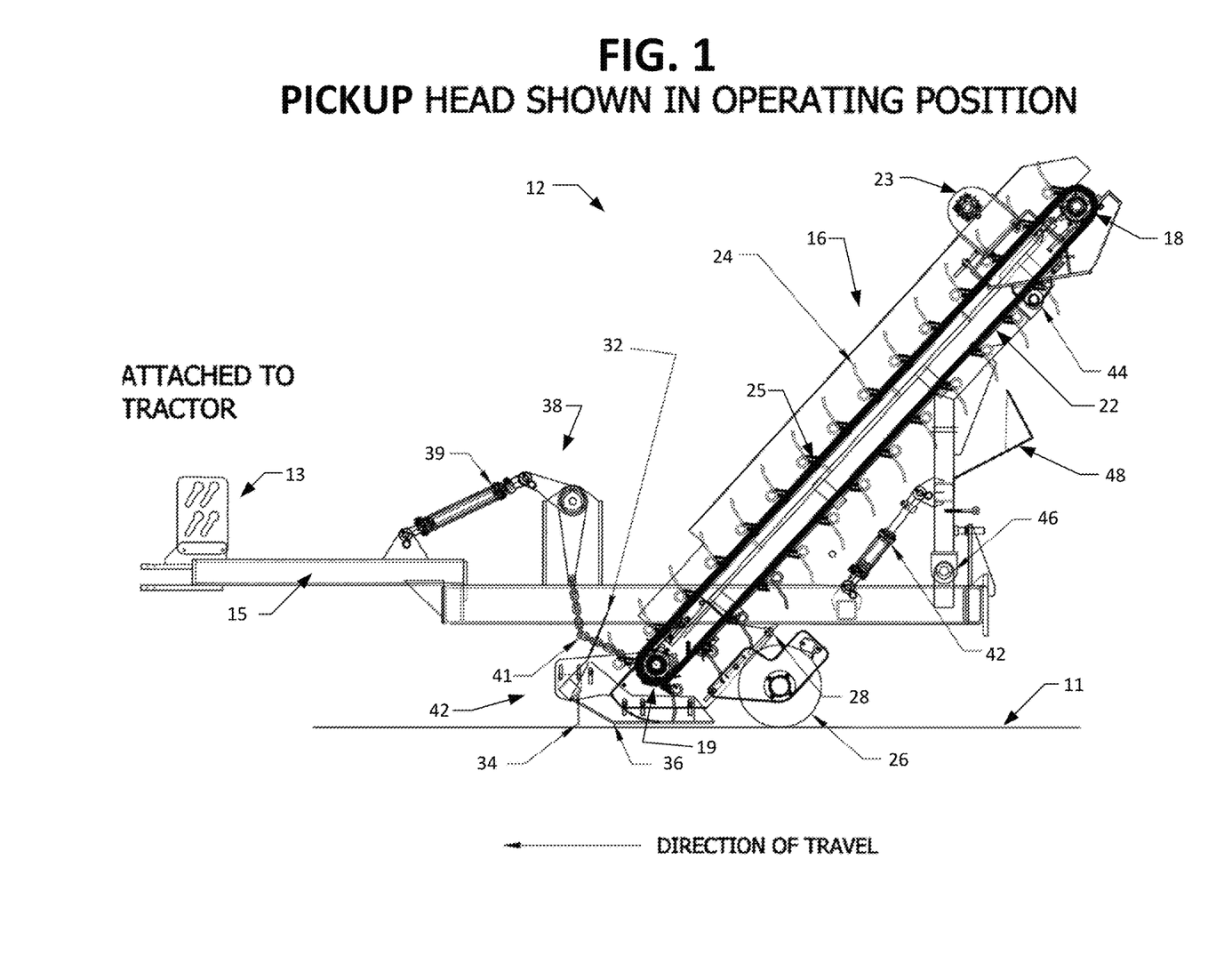
FIG. 1 is a side view of a pickup head according to the present disclosure in an operating position for picking up sod scraps from the ground when pulled by a tractor.
Figure 2:
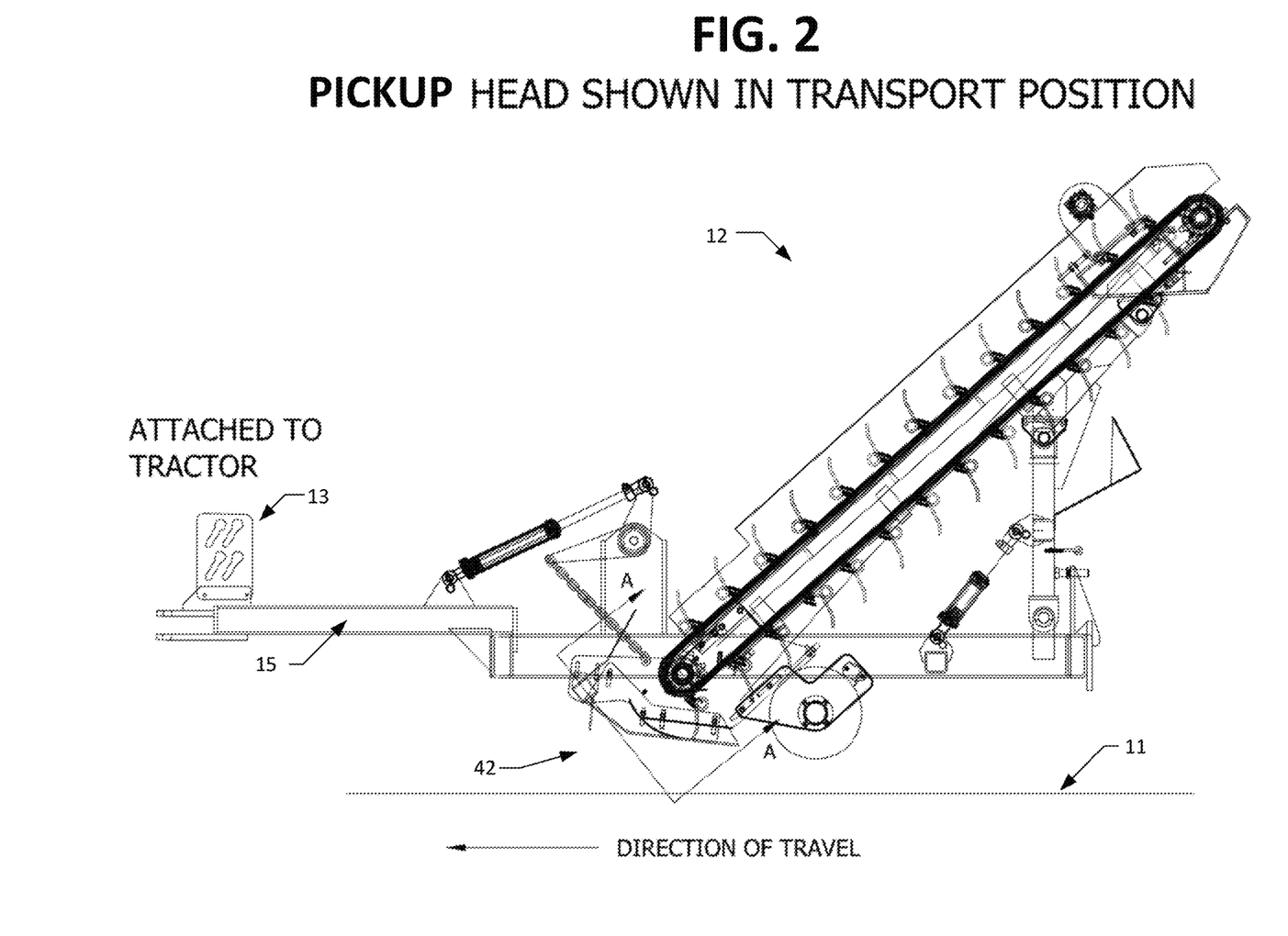
FIG. 2 is a side view of the pickup head of FIG. 1 in a transport position when not in use or operation.

FIG. 1 is a side schematic view of a preferred embodiment of the pickup head 12 according to the present disclosure in an operating position for picking up sod scraps from the ground when hitched to and pulled by the tractor. FIG. 2 is a side schematic view of the pickup head 12 in a transport position when not in use or operation.

The construction and operation of the pickup head 12 will now be described in detail. The pickup head 12 includes a pickup head frame 15 to be pulled by the tractor in a horizontal direction of travel along the ground, as illustrated in FIGS. 1 and 2. The pickup head frame 15 can be any suitable structure for supporting the pickup head elements described herein. A pickup chain conveyor 16 is mounted to the pickup head frame 15. The pickup chain conveyor 16 includes parallel right and left side upper sprockets 18 and inline parallel right and left side lower sprockets 19. The upper sprockets 18 are situated higher than the lower sprockets 19 in a vertical direction relative the horizontal direction of travel and behind the lower sprockets 19 in the horizontal direction of travel.

Right and left side pickup chains 22 are configured to move along respective right and left side paths around the upper sprockets 18 and around the lower sprockets 19 in generally a looping manner.

The right side and/or left side pickup chains 22 are driven by a chain drive mechanism 23. The drive chain mechanism 23 includes, among other things, a hydraulic motor and suitable mechanical linkage to the chains 22, including for example, a gearbox connected to the motor, a chain drive sprocket driven by the gearbox, a chain connecting the drive sprocket to a sprocket associated with the upper sprocket 18, etc. The hydraulic motor is controlled by a controller operated by an operator to move the pickup chains 22 along the respective chain paths.

In an alternative embodiment, although not preferable, the pickup head chain conveyer 16 can be implemented via a single pickup chain 22 that passes around a single set of upper and lower sprockets 18, 19, situated at either the right or left side of the pickup head 12.

A plurality of pickup teeth 24 are mounted to and movable by the pickup chain 22 and extend outwardly from the outer faces of the pickup head conveyor 16 (as well as pickup chain 22).

In the preferred embodiment, a plurality of elongated, horizontal, parallel, spaced apart, mounting bars 25 attached to and movable by the pickup chains 22 around the looping path defined by the sprockets 18, 19. The mounting bars 25 are spaced apart in the vertical direction. Moreover, the plurality of pickup teeth 24 are mounted to and movable by the bars 25. They are spaced apart on each bar 25 at a suitable distance.

Figure 5:
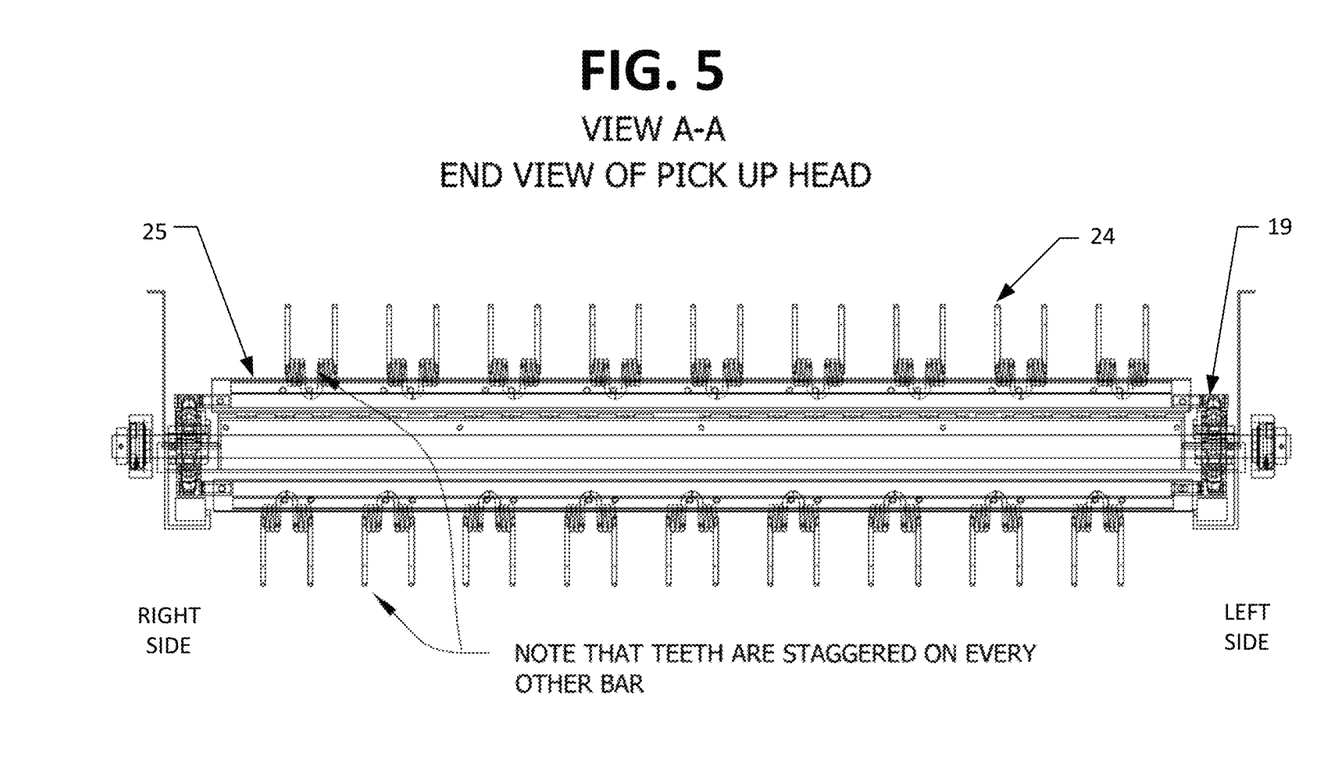
FIG. 5 is an end view A-A as indicated on FIG. 2, showing the spacing of pickup teeth and the staggering of pickup teeth on adjacent mounting bars.

Preferably, although not limited to this embodiment, the pickup teeth 24 are peanut combine teeth, which are well known in the art and which are commercially available from numerous retail sources. As shown in FIG. 5, the peanut combine teeth 24 come in pairs with each tooth extending outwardly from a spring loaded base (torsion spring at the base). Each of the teeth 24 slightly bends, or is angled, at its end, as shown. When installed on the mounting bars 25, the teeth extend outwardly about 4¼ inches from the mounting bars 25. In this embodiment, there are 9 pairs (18 total teeth) of peanut combine teeth per mounting bar 25, and the pickup teeth are staggered (i.e., not in alignment) on adjacent mounting bars, as illustrated in FIG. 5, in order to optimize ground coverage and pickup ability.

The pickup head conveyor 16 has generally a front side and a rear side. The front side faces the horizontal direction of travel and is at a transverse angle relative to the direction of travel. The pickup chains 22 on the front side move upward and backward from the lower sprockets 19 toward the upper sprockets 18, while the rear side moves downward and frontward from the upper sprockets 18 toward the lower sprockets 19. The pickup teeth 24 at the front side move the sod scraps generally upwardly from a pickup point on the ground 11 and the pickup teeth 24 at the rear side of the pickup chains 22 move generally downwardly.

A roller 26 is mounted to the pickup head frame. The roller 26 is configured to ride along and against the ground 11 as a primary support for the pickup head frame 15. The roller 26 is for gauging the teeth clearance from the ground 11. In the preferred embodiment, the roller 26 has an elongated cylindrical body that extends and rolls freely and horizontally along the ground 11 about an elongated supporting axel. It is preferably about 12 inches in cross-sectional diameter.

Preferably, a vertical roller adjustment mechanism 28 is configured to move the roller 26 relative to the pickup head frame 15 so that a particular distance between the pickup teeth 24 passing around the lower sprocket 19 and underlying ground 11 at the pickup point can be selected that enables sod scraps to be efficiently and effectively picked up by the pickup teeth 24. In the preferred embodiment, the particular distance is set in a range between about ⅛ inch and about ¼ inch. With this setting, the pickup teeth 24 will only occasionally touch the ground 11 and make a visible mark (because the ground 11 is not sufficiently planar flat). The foregoing range was determined based upon extensive testing.

In the preferred embodiment, a generally planar, horizontally elongated, metal shield 32 provided at the front and bottom of the pickup head conveyor 16 and extends between the right and left sides of the pickup head conveyor 16. The shield 32 moves in front of and slightly above the pickup point, as shown. The shield 32 has a generally planar front surface that blocks ground debris from skipping upwardly and has a generally planar rear surface facing the pickup teeth 24 that assists the pickup teeth 24 in picking up sod scraps by preventing the scraps from falling off of the pickup teeth 24 as the pickup teeth 24 move the sod scraps upwardly from the pickup point toward and along the front side of the pickup chain conveyor 16.

The pickup head 12 can optionally include one or more guards extending downwardly from the pickup head frame 15 to block debris. In the preferred embodiment, a rubber guard 34 is provided for blocking debris.

The pickup head 12 can further optionally include a skid shoe 36, if desired. In the preferred embodiment, the skid shoe 36 extends downwardly from the pickup head frame 15 and prevents the pickup teeth 24 from entering the ground 11 when the roller 26 that is mounted to the pickup head frame 15 falls into a pivot track or other irregularity on or associated with the ground 11.

The pickup head 12 can also include one or more hydraulic and/or pneumatic cylinders and/or mechanical mechanisms for moving the pickup head 12 in various directions, if desired. Any and all such cylinders and/or mechanisms can be controlled with conventional controllers, which are well known in the art. In the preferred embodiment, the pickup head 12 includes a mechanism 38 for lifting and lowering a head 42, which includes, among other things, the lower sprocket 19 of the conveyor 16, the pickup teeth 24 running along the bottom of the lower sprocket 19, and the roller 26, relative to the ground 11. When moved, the pickup head conveyer 16 is pivoted at the horizontally oriented pivot axil 44. This mechanism 38 includes a cylinder 39 for moving the head 42 that is configured to pull up and lower a chain 41 attached to the head 42 by way of a mechanical levering mechanism, as shown.

This embodiment further includes a mechanism having a cylinder 39 and associated mechanical linkage for moving the pickup head conveyor 16 to change the transverse angle. As mentioned, the front side of the conveyor 16 faces the horizontal direction of travel at the transverse angle. This movement is desirable for bringing the top of the conveyor 16 forward to clear the dump bed 14 when dumping sod scraps from the dump bed 14. When moved, the conveyer 16 is pivoted at the horizontally oriented pivot axil 46.

The pickup head 12 can also be equipped with a deflector 48. The deflector 48 is configured to contact and scrape the sod scraps while the sod scraps are moved downwardly on the pickup chain conveyor 16 in order to efficiently remove the scraps from the pickup chain conveyor 16. The deflector 48 is also configured to guide the removed scraps into the storage housing of the dump bed 14. The deflector 48 can be any suitable size and shape to accomplish the foregoing purposes. However, in the preferred embodiment, the deflector 48 has a body that is a generally rectangular elongated planar structure supported by a transverse attachment to the pickup head frame 15 that horizontally extends along and at a slight distance from the tips of the pickup teeth 24.

The construction and operation of the dump bed 14 will now be described with reference to FIGS. 3 and 4. The dump bed 14 includes a dump bed frame 52 that is attached to or an integral part of and is pulled by the pickup head frame 12, while the pickup head frame 15 is in turn is attached to and pulled by the tractor. The dump bed frame 52 can be any suitable structure for supporting the dump bed elements described herein.

A plurality of wheels 54, but preferably four in the preferred embodiment with two on each of the right and left sides, are situated at an underside of the dump bed frame 52. These wheels 54 enable movement of the dump bed frame 52 along the ground 11.

A sod scrap storage housing 56 associated with the dump bed 14 is defined by a plurality of upstanding vertical walls. In the preferred embodiment, the base of the housing 56 is generally rectangular. The storage housing encloses a sod scrap storage area with a front wall 62 and a rear wall 64. The front wall 62 is shorter than the rear wall 64 in the vertical direction, so that the storage area gradually increases in an upward manner from the front wall 62 to the rear wall 64.

The rear wall 64 of the dump bed 14 is or has a door 66 that can be opened and closed. The door 66 is mounted via a hinge, preferably at the top, to the dump bed frame 52 to enable the opening and closing of same.

The dump bed 14 can also be equipped with one or more hydraulic and/or pneumatic cylinders and/or mechanical mechanisms for moving the dump bed 14 in various directions, if desired. Any and all such cylinders and/or mechanisms can be controlled with conventional controllers, which are well known in the art. In the preferred embodiment, the dump bed 14 includes a cylinder 68 with associated mechanical linkage attached to the sod scrap storage housing 56 for the purpose of tipping, or pivoting, the sod scrap storage housing 56 backward, i.e., lifting the front wall 62 while permitting the rear wall 64 to pivot along the back edge of the dump bed 14, in order to pour sod scraps out the door 66 when the door 66 is opened.

A dump bed chain conveyor 72 is mounted over the storage housing 56 and extends between the front wall 62 and the rear walls 64. The dump bed conveyer 72 preferably includes a pair of parallel right and left side upper sprockets 74 and a pair of inline parallel right and left side lower sprockets 75. The upper sprockets 74 are situated higher than the lower sprockets 75 in a vertical direction relative to the horizontal direction of travel and behind the lower sprockets 75 in the horizontal direction of travel. The upper sprockets 74 are situated near the rear wall 75. The lower sprockets 75 are situated near the front wall 62.

Right side and left side dump bed chains 76 move along respective right and left side paths in a closed looping manner around the respective upper sprockets 74 and the lower sprockets 75.

The right side and/or left side dump bed chains 76 are driven by a chain drive mechanism 77. The drive chain mechanism 77 includes, among other things, a hydraulic motor and suitable mechanical linkage from the motor to the chains 76, for example, a gearbox connected to the motor, a chain drive sprocket driven by the gearbox, a chain connecting the drive sprocket to sprocket associated with an axel connecting and driving the upper sprockets 74, etc. The motor is controlled by a controller operated by an operator to move the dump bed chains 76 along the chain paths.

In an alternative embodiment, although not preferable, the dump bed chain conveyer 72 can be implemented via a single dump bed chain 76 that passes around a single set of upper and lower sprockets 74, 75, situated at either the right or left side of the dump bed 14.

A plurality of elongated, horizontal, parallel, sweeping bars 73 are attached to, extend between, and are movable by the chains 76. The sweeping bars 73 are spaced apart. The sweeping bars 73 are movable along a top of the sod scrap storage area.

The dump bed chain conveyor 72 has generally a front side and a rear side. The front side faces the horizontal direction of travel and is at a transverse angle. The dump bed chains 76 (as well as sweeping bars 73) on the front side move downward and frontward from the upper sprockets 74 toward the lower sprockets 75. Moreover, the dump bed chains 76 (as well as sweeping bars 73) at the rear side move upward and backward from the lower sprockets 75 toward the upper sprockets 74. The rotational direction of movement of the dump bed chains 76 is generally opposite to the rotational direction of the pickup chains 22.

Because of the sweeping bars 73 at the top, or roof, of the storage housing 56 are at an angle from front to back and move as described, sod scraps fill the storage housing 56 from the front of the storage housing 56 to the rear of the storage housing 56, i.e., the sod scraps are stacked and the top of the stack moves up along the top of the housing 56 as the housing 56 is filled with sod scraps.

Variations and Modifications

It should be emphasized that the aforementioned embodiments of the present invention, particularly, any "preferred" embodiments, are merely intended to be possible non-limiting examples of implementations, set forth for a clear understanding of the principles of the invention. Many variations and modifications can be made to the above-described embodiment(s) of the invention without departing substantially from the spirit and principles of the invention. Any and all such modifications and variations are intended to be included herein within the scope of this disclosure and the present invention(s).

As an example of a variation, the sod scrap collection apparatus 10 could be implemented with belt conveyers that use belts and pulleys, instead of chain conveyers (as in the preferred embodiment) that use chains and sprockets, respectively.

The invention claimed is:

1. A sod scrap collection apparatus that enables pickup and collection of scraps of sod lying on ground, the sod scrap collection apparatus connectable to and for being pulled by a tractor, the apparatus comprising:
  (a) a pickup head having:
    (1) a pickup head frame to be pulled by the tractor in a horizontal direction of travel along the ground;
    (2) a pickup chain conveyor mounted to the pickup head frame, the pickup chain conveyor having:
      (i) right and left side upper sprockets and right and left side lower sprockets, the upper sprockets situated higher than the lower sprockets in a vertical direction relative to the horizontal direction of travel and behind the lower sprockets in the horizontal direction of travel;
      (ii) right and left side pickup chains that move along respective paths around the right and left side upper sprockets and around the right and left side lower sprockets;
      (iii) a plurality of horizontal parallel mounting bars attached to, extending between, and movable by the chains, the mounting bars being spaced apart;

(iv) a plurality of pickup teeth mounted to the mounting bars, the pickup teeth extending outwardly from the mounting bars;

(v) wherein the pickup chain conveyor has a front side and a rear side, the front side facing the horizontal direction of travel at a transverse angle, the pickup chain on the front side moving upward and backward from the lower sprockets toward the upper sprockets, the rear side moving downward and frontward from the upper sprockets toward the lower sprockets; and (vi) wherein the pickup teeth at the front side move generally upwardly from a pickup point on the ground and the pickup teeth at the rear side move generally downwardly;

(3) a roller mounted to the pickup head frame; and (4) a vertical roller adjustment mechanism configured to move the roller relative to the frame so that a particular distance between the pickup teeth passing around the lower sprocket and underlying ground at the pickup point can be selected that enables sod scraps to be picked up by the pickup teeth; and (b) a dump bed having:

(1) a dump bed frame attached to and pulled by the pickup head frame;

(2) a plurality of wheels at an underside of the dump bed frame enabling movement of the dump bed frame along the ground;

(3) a sod scrap storage housing defined by a plurality of upstanding vertical walls, the storage housing enclosing a sod scrap storage area with a front wall and a rear wall, the front wall being shorter than the rear wall;

(4) a dump bed chain conveyor mounted over the storage housing and extending between the front and rear walls, the dump bed conveyer having:

(i) dump bed right and left side upper sprockets and dump bed right and left side lower sprockets, the dump bed upper sprockets situated higher than the dump bed lower sprockets in a vertical direction relative to the horizontal direction of travel and behind the dump bed lower sprockets in the horizontal direction of travel, the dump bed upper sprockets situated near the rear wall, the dump bed lower sprockets situated near the front wall;

(ii) right and left side dump bed chains that move along respective paths around the dump bed right and left side upper sprockets and the dump bed right and left side lower sprockets;

(iii) wherein the dump bed chain conveyor has a front side and a rear side, the dump bed front side facing the horizontal direction of travel at another transverse angle, the right and left side dump bed chains on the dump bed front side moving downward and frontward from the dump bed upper sprockets toward dump bed lower pulleys, the dump bed rear side moving upward and backward from the dump bed lower sprockets toward the dump bed upper sprockets; and (iv) a plurality of horizontal parallel sweeping dump bed mounting bars attached to, extending between, and movable by the dump bed chains, the dump bed mounting bars being spaced apart, the dump bed mounting bars being movable along a top of the sod scrap storage area.

2. The apparatus of claim 1, further comprising a deflector that contacts and scrapes the scraps while being moved downwardly on the pickup chain conveyor in order to remove the scraps from the pickup chain conveyor, the deflector configured to guide the removed scraps into the storage housing of the dump bed.

3. The apparatus of claim 1, wherein the pickup head further comprises a guard extending downwardly from the pickup head frame, the guard moving in front of the pickup point and blocking ground debris from interfering with operation of the pickup chain conveyor at the pickup point.

4. The apparatus of claim 1, further comprising a skid shoe, the skid shoe extending downwardly from the pickup head frame and preventing the pickup teeth from entering the ground when the roller mounted to the pickup head frame falls into a pivot track.

5. The apparatus of claim 1, further comprising a means for lifting and lowering a head, which comprises the lower sprocket, the pickup teeth, and the roller, relative to the ground.

6. The apparatus of claim 1, further comprising a means for moving the pickup head conveyor to change the transverse angle.

7. The apparatus of claim 1, wherein the pickup teeth are peanut combine teeth and the teeth are staggered on adjacent mounting bars.

8. The apparatus of claim 1, wherein the rear wall of the dump bed comprises a door that can be opened and closed, the door mounted via a hinge to the dump bed frame, and further comprising a means for tipping the sod scrap storage housing to pour sod scraps out the door when opened.

9. The apparatus of claim 1, wherein the particular distance between the pickup teeth passing around the lower sprocket and the ground at the pickup point is in a range between about 1/8 inch and about 1/4 inch.

10. The apparatus of claim 1, further comprising a shield situated at the front side of the pickup chain conveyor, the shield having a generally planar surface extending between the right and left sides of the pickup chain conveyor and facing the pickup teeth, the shield designed to assist the pickup teeth in picking up the sod scraps by preventing the sod scraps from falling off of the pickup teeth as the pickup teeth move the sod scraps upwardly from the pickup point toward and along the front side of the pickup chain conveyor.

11. A pickup head for picking up scraps of sod lying on ground, the pickup head capable of being pulled by a tractor, the pickup head comprising:

(1) a pickup head frame to be pulled by the tractor in a horizontal direction of travel along the ground;

(2) a pickup chain conveyor mounted to the pickup head frame, the pickup chain conveyor having:

(i) right and left side upper sprockets and right and left side lower sprockets, the upper sprockets situated higher than the lower sprockets in a vertical direction relative to the horizontal direction of travel and behind the lower sprockets in the horizontal direction of travel;

(ii) right and left side pickup chains that move along respective paths around the right and left side upper sprockets and around the right and left side lower sprockets;

(iii) a plurality of horizontal parallel mounting bars attached to, extending between, and movable by the chains, the mounting bars being spaced apart;

(iv) a plurality of pickup teeth mounted to the mounting bars, the pickup teeth extending outwardly from the mounting bars;

(v) wherein the pickup chain conveyor has a front side and a rear side, the front side facing the horizontal direction of travel at a transverse angle, the pickup chain on the front side moving upward and backward from the lower sprockets toward the upper sprockets, the rear side moving downward and frontward from the upper sprockets toward the lower sprockets; and (vi) wherein the pickup teeth at the front side move generally upwardly from a pickup point on the ground and the pickup teeth at the rear side move generally downwardly;

(3) a roller mounted to the pickup head frame; and (4) a vertical roller adjustment for moving the roller relative to the frame so that a particular distance between the pickup teeth passing around the lower rotational means and underlying ground at the pickup point can be selected that enables sod scraps to be picked up by the pickup teeth.

12. A pickup head for picking up scraps of sod from the ground, the pickup head capable of being pulled by a tractor, the pickup head comprising:

(1) a pickup head frame to be pulled by the tractor in a horizontal direction of travel along the ground;

(2) a pickup conveyor mounted to the pickup head frame, the pickup conveyor having:

(i) right and left upper rotational means and right and left lower rotational means, the upper rotational means situated higher than the lower rotational means in a vertical direction relative to the horizontal direction of travel and behind the lower rotational means in the horizontal direction of travel;

(ii) right and left pickup linkage means for moving along respective paths around the upper rotational means and around the lower rotational means;

(iii) a plurality of pickup teeth that are movable by the pickup linkage means and that extend outwardly from the pickup linkage means;

(iv) wherein the pickup conveyor has a front side and a rear side, the front side facing the horizontal direction of travel at a transverse angle, the pickup linkage means on the front side moving upward and backward from the lower rotational means toward the upper rotational means, the rear side moving downward and frontward from the upper rotational means toward the lower rotational means; and (v) wherein the pickup teeth at the front side move the scraps generally upwardly from a pickup point on the ground and the pickup teeth at the rear side of the pickup linkage means move the scraps generally downwardly;

(3) a roller mounted to the pickup head frame; and (4) a vertical roller adjustment for moving the roller relative to the frame so that a particular distance between the pickup teeth passing around the lower rotational means and underlying ground at the pickup point can be selected that enables sod scraps to be picked up by the pickup teeth.

13. An apparatus comprising the pickup head of claim 12 and a dump bed, the dump bed comprising:

(1) a dump bed frame attached to or part of and pulled by the pickup head frame;

(2) a plurality of wheels at an underside of the dump bed frame enabling movement of the dump bed frame along the ground;

(3) a sod scrap storage housing defined by a plurality of upstanding vertical walls, the storage housing enclosing a sod scrap storage area with a front wall and a rear wall, the front wall being shorter than the rear wall;

(4) a dump bed conveyor mounted over the storage housing and extending between the front and rear walls, the dump bed conveyer having:

(i) right and left side upper rotational means and right and left side lower rotational means, the upper rotational means situated higher than the lower rotational means in a vertical direction relative to the horizontal direction of travel and behind the lower rotational means in the horizontal direction of travel, the upper rotational means situated near the rear wall, the lower rotational means situated near the front wall;

(ii) right and left side dump bed linkage means for moving along respective paths around the upper rotational means and the lower rotational means;

(iii) wherein the dump bed conveyor has a front side and a rear side, the dump bed front side facing the horizontal direction of travel at another transverse angle, the dump bed chain on the dump bed front side moving downward and frontward from the upper rotational means toward the lower rotational means, the dump bed rear side moving upward and backward from the lower rotational means toward the upper rotational means; and (iv) a plurality of horizontal parallel sweeping dump bed bars attached to, extending between, and movable by the dump bed linkage means, the dump bed bars being spaced apart, the dump bed bars being movable along a top of the sod scrap storage area.

14. The apparatus of claim 3, wherein the pickup conveyor is a chain conveyor, the rotational means are sprockets, and the pickup linkage means are chains.

15. The apparatus of claim 13, wherein the pickup conveyor is a belt conveyor, the rotational means are pulleys, and the pickup linkage means are belts.

16. The apparatus of claim 13, wherein the pickup conveyor, the dump bed conveyer, or both, are chain conveyers, the rotational means are sprockets, the pickup linkage means are chains, and the dump bed linkage means are chains.

17. The apparatus of claim 13, wherein the pickup conveyor, the dump bed conveyer, or both, are belt conveyers, the rotational means are pulleys, the pickup linkage means are belts, and the dump bed linkage means are belts.

18. The apparatus of claim 13, further comprising a shield situated at the front side of the pickup chain conveyor, the shield having a generally planar surface extending between the right and left sides of the pickup chain conveyor and facing the pickup teeth, the shield designed to assist the pickup teeth in picking up the sod scraps by preventing the sod scraps from falling off of the pickup teeth as the pickup teeth move the sod scraps upwardly from the pickup point toward and along the front side of the pickup chain conveyor.

19. A pickup head for picking up scraps of sod from the ground, the pickup head capable of being pulled by a tractor, the pickup head comprising:

a pickup head frame to be pulled by the tractor in a horizontal direction of travel along the ground;

a pickup conveyor mounted to the pickup head frame, the pickup conveyor configured to move a plurality of outwardly extending pickup teeth from a pickup position near the ground to a discard position near a dump bed;

wherein the pickup conveyor has a front side and a rear side, the front side facing the horizontal direction of travel at a transverse angle, the pickup conveyor on the front side moving the teeth upward and backward, the rear side moving the teeth downward and frontward;

a roller mounted to the pickup head frame; and a vertical roller height adjustment that enables adjustment of the teeth relative to the ground so that a particular distance between the teeth and the ground can be selected to enable sod scraps to be picked up by the teeth.

20. An apparatus comprising the pickup head of claim 19 and a dump bed, the dump bed comprising:

a dump bed frame attached to or part of and pulled by the pickup head frame;

a plurality of wheels at an underside of the dump bed frame enabling movement of the dump bed frame along the ground;

a sod scrap storage housing on the dump bed frame, the housing defining a sod scrap storage area, the housing having a front and a back; and a dump bed conveyor mounted over the storage area, the dump bed conveyer configured to move a plurality of parallel spaced sweeping bars along a top of the sod scrap storage area from the front to the back at an upward angle and configured to cause the sod scraps to be piled in the storage area from the front to the back.

21. The apparatus of claim 20, further comprising a deflector that contacts and scrapes the scraps while being moved downwardly on the pickup conveyor in order to remove the scraps from the pickup conveyor, the deflector configured to guide the removed scraps into the storage housing of the dump bed.

22. The apparatus of claim 20, wherein the pickup head further comprises a guard extending downwardly from the pickup head frame, the guard moving in front of the pickup point and blocking ground debris from interfering with operation of the pickup conveyor at the pickup point.

23. The apparatus of claim 20, further comprising a skid shoe, the skid shoe extending downwardly from the pickup head frame and preventing the pickup teeth from entering the ground when the roller mounted to the pickup head frame falls into a pivot track.

24. The apparatus of claim 20, wherein the pickup teeth are peanut combine teeth and the teeth are staggered on adjacent mounting bars.

25. The apparatus of claim 20, wherein a back wall of the dump bed comprises a door that can be opened and closed, the door mounted via a hinge to the dump bed frame, and further comprising a means for tipping the sod scrap storage housing to pour sod scraps out the door when opened.

26. The apparatus of claim 20, further comprising a shield situated at the front side of the pickup conveyor, the shield having a generally planar surface extending between the right and left sides of the pickup chain conveyor and facing the pickup teeth, the shield designed to assist the pickup teeth in picking up the sod scraps by preventing the sod scraps from falling off of the pickup teeth as the pickup teeth move the sod scraps upwardly from the pickup point toward and along the front side of the pickup conveyor.

27. The apparatus of claim 20, wherein the pickup conveyor is a chain conveyor.

28. The apparatus of claim 20, wherein the dump bed conveyor is a chain conveyor.

\* \* \* \* \*